(12) United States Patent
Kabel

(10) Patent No.: US 6,335,905 B1
(45) Date of Patent: Jan. 1, 2002

(54) METHOD FOR ELIMINATION OF PASSIVE NOISE INTERFERENCE IN SONAR

(75) Inventor: Darrin W. Kabel, Overland Park, KS (US)

(73) Assignee: Garmin Corporation (TW)

( * ) Notice: Subject to any disclaimer, the term of this patent is extended or adjusted under 35 U.S.C. 154(b) by 0 days.

(21) Appl. No.: 09/465,620

(22) Filed: Dec. 17, 1999

(51) Int. Cl.[7] .................................................. G01S 15/00
(52) U.S. Cl. .............................................................. 367/98
(58) Field of Search ................................. 367/98, 97, 99

(56) References Cited

U.S. PATENT DOCUMENTS

| | | | |
|---|---|---|---|
| 3,893,061 A | 7/1975 | Slawsky et al. | 367/134 |
| 4,549,286 A | * 10/1985 | Langeraar et al. | 367/97 |
| 4,700,332 A | 10/1987 | Hwang | 367/98 |
| 4,777,630 A | 10/1988 | Burns | 367/87 |
| 5,260,912 A | 11/1993 | Latham | 367/98 |
| 5,459,479 A | 10/1995 | Cummings | 367/108 |

\* cited by examiner

Primary Examiner—Daniel T. Pihulic
(74) Attorney, Agent, or Firm—Devon A. Rolf

(57) ABSTRACT

A sonar depth sounder device and method for processing echo signals, reflected from objects within a body of water, utilizes a processor, a memory, a display, and a keypad connected to the processor. The receiver receives sonar signals indicative of ambient noise in an underwater environment. The processor receives an electrical signal representative of the ambient noise, and calculates a detection threshold. The detection threshold is calculated by multiplying a scaling factor times the variance of the signal indicative of the ambient noise, and adding that product to the mean of the signal indicative of the ambient noise in the underwater environment. A transmitter then excites a transducer which emits sonar pulses into a body of water, and a receiver receives reflected sonar echo signals. When the intensity of the reflected sonar echo signals is less than the detection threshold, the reflected echo signals are eliminated from processing. When, however, the amplitude of a reflected sonar signal is greater than the detection threshold, the processor causes data indicative of the reflected sonar signal to be displayed on the display. Further, the detection threshold is increased from its starting point over time to compensate for increasing a gain in the receiver of the sonar depth sounder device. Additionally, the detection threshold is periodically updated to compensate for changes in ambient noise in the underwater environment. In an alternate embodiment, after a preliminary value is determined, based upon ambient noise or predicted ambient noise, the sonar depth sounder device generates a continuous time-varying detection threshold by sampling a received echo signal and storing the samples in memory, applying a continuous time averaging technique to the sampled data, wherein sample data comprises a time varying detection threshold. That time varying detection threshold is then compared on a sample-by-sample basis with corresponding samples of the originally received data, such that the originally received data that is greater than its corresponding detection threshold sample is displayed, whereas originally received data is less than its corresponding detection threshold sample is rejected and not displayed. In a preferred embodiment, in order to display data indicative of an originally received data sample that is greater than the detection threshold, it must be part of a sequence of consecutive data samples that are greater than the corresponding detection threshold samples, wherein that sequence has an associated time that is greater than a selected time limit.

17 Claims, 9 Drawing Sheets

METHOD FOR ELIMINATION OF PASSIVE NOISE INTERFERENCE IN SONAR

BACKGROUND OF THE INVENTION

1. Field of the Invention

The present invention is generally directed to a depth sounder, such as employed in fish finding apparatus. More particularly, the present invention is directed to a depth sounder and method for eliminating noise.

2. Description of the Related Art

The use of sonar echo sounding for recreational and commercial fish finding purposes, and for other underwater object identification, is widespread. These devices utilize sonar signals to develop a view of underwater environment.

One major problem faced by manufacturers of depth sounders is that, underwater environments are often noisy and the noise levels can, and do, vary widely. This noise interferes with accurate underwater detection and makes it difficult, both for the device and the user, to interpret an underwater environment.

In order to alleviate the problem of noise, many prior depth sounder products utilize what is commonly known as a detection threshold, of a selected amplitude, such that sonar echo signals, which correspond to sonar pulses transmitted from the sounder device and which have reflected off of the bottom of a body of water or off of any object in the water, that are louder than the detection threshold are accepted, while sonar echo signals that are quieter than the detection threshold are rejected. More particularly, such products typically display, on a display screen, data corresponding to sonar echo signals which are louder than the detection threshold, but do not display data corresponding to sonar echo signals which are quieter than the detection threshold.

As will be appreciated, the placement of the detection threshold is a critical step in the manufacture of such depth sounders. In this regard, the higher the detection threshold value, the more noise that will be rejected and the more likely echo signals received by the depth sounder will be accurately interpreted as underwater environment. However, a high detection threshold has the drawback of potentially rejecting weak signals that, when compared with a lower detection threshold, would have been received and interpreted. Conversely, a low detection threshold allows weaker (and thus a potentially greater number of sonar echos) to be received and interpreted, but increases the likelihood that noise will be incorrectly interpreted as underwater environment.

While there are many theories and practices relating to the proper placement of the detection threshold, the need remains for a sonar depth sounder which efficiently adjusts the detection threshold based upon a change in noise levels. The present invention fills this need and other needs, in a unique manner.

SUMMARY OF THE INVENTION

A sonar depth sounder of the present invention has a processor. An input, a display, and a memory, are connected to the processor. The processor is connected to a transmitter/receiver, which is in turn connected to a transducer. In use, the transmitter transmits a plurality of signals, which are emitted from the transducer as sonar signals towards the bottom surface of a body of water. The receiver receives sonar signals reflected back from the bottom surface of the body of water, and reflected from any objects resting on the bottom surface of the body of water or suspended between the top surface of the body of water and the bottom surface of the body of water.

In accordance with an aspect of the present invention, the processor first takes a passive noise interrogation such that the receiver receives sonar signals that are not echo signals received in response to a corresponding transmission from the transmitter. Rather, the processor receives, from the receiver, a signal representative of the ambient noise in the underwater environment. The processor processes that signal to calculate a detection threshold value, and stores the detection threshold value in the memory of the sounder device.

More particularly, the processor calculates a mean of the sonar signal representative of the environmental noise in the underwater environment, and also calculates a variance of the signal. Specifically, the processor determines the detection threshold (DT) value according to the following equation:

$$DT = mean + \alpha variance$$

where mean is the mean of the signal indicative of the ambient noise in the underwater environment, variance is the variance of the signal indicative of the ambient noise in the underwater environment, and a is a scaling factor. The scaling factor a is determined through testing, and is preferably approximately 7. Other scaling factors, however, could be utilized.

Once the detection threshold value is stored in memory, the processor causes the transmitter to transmit a plurality of signals, which are emitted from the transducer as sonar signals, towards the bottom surface of the body of water. As stated, the receiver receives reflected echo sonar signals back from the bottom surface of the body of water, and reflected from any objects on the bottom surface or suspended between the top and bottom surface of the body of water. The processor receives electrical signals indicative of the reflected sonar signals, and determines whether these signals are of an amplitude greater than the detection threshold. When the signals are greater in amplitude than the detection threshold value, the processor displays data, on the display, indicative of the underwater environment. For example, in accordance with known techniques, in the event a reflected echo signal is believed to indicate that a fish is located within the body of water, an icon indicative of a fish is displayed on the display.

In accordance with an additional aspect of the invention, from a point in time at which the transmitter transmits a sonar signal into the body of water, the detection threshold value is increased over time to compensate for increased gain associated with the receiver. In this regard, it will be understood that for sonar depth sounders which an increase of gain over time, the detection threshold value ramps upwardly linearly over time at a slope that is determined through testing. It will be understood, however, that increasing the detection threshold value over time could be accomplished in other manners.

In an alternate embodiment of the present invention, data indicative of ambient noise in an underwater environment, such as ambient noise from a boat motor or water moving past a transducer of a sonar depth sounder, is monitored and eliminated in accordance with a time-varying detection threshold methodology. In particular, a preliminary value corresponding to actual or predicted ambient noise is determined. As discussed, this preliminary value may be determined by taking a passive interrogation (e.g., listening to noise in an underwater environment that is not in response to an echo pulse from the sonar depth sounder). In this way, the ambient noise within the underwater environment to be interrogated is received by the sonar depth sounder, and converted into a data value indicative of the underwater ambient noise. Alternatively, this preliminary value may be established according to a user input. For example, the sonar depth sounder of the present invention may include a knob for varying the level of data rejection desired and, for example, may have corresponding inputs associated with "low", "medium", and "high" ambient noise rejection levels. In this case, corresponding low, medium, and high data values are stored in the memory in association with the respective low, medium, and high inputs, such that upon activation of one of the inputs, the corresponding data is recalled and used as the preliminary numeric value intended to be indicative of ambient noise conditions in the underwater environment.

Once the preliminary value corresponding to a rejection level is established, the sonar depth sounder processes an active interrogation cycle, in which a sonar pulse is transmitted into the underwater environment. As described, and as will be understood, corresponding echo pulses are received by the sonar depth sounder. In accordance with an aspect of the invention, data indicative of the received echo pulses are digitized and stored in a memory. In accordance with a further aspect of the invention, a continuous-time averaging technique is applied to the sequence of data corresponding to the interrogation cycle. This averaging process is preferably carried out by applying a low pass filtering technique to the data sequence, although other continuous-time averaging techniques, such as correlative window techniques may be employed. The result of the continuous-time averaging process is an averaged (e.g., filtered) value for each sample of the data. This resulting sequence of averaged (or filtered) data provides a time varying detection threshold.

Upon completion of the continuous-time (e.g., filtering) process, lower and upper limits are applied to the detection threshold. In other words, any filtered sample having a value more than the lower limit, or higher than the upper limit, is clipped to the corresponding limit. A numeric measure associated with these limits is based upon the preliminary established value (e.g., that value associated with the actual or predicted ambient noise conditions of the underwater environment).

Following application of lower and upper limits to each sample of the averaged filtered data, a sample by sample comparison is made in which each sample of the filtered (and possibly clipped) data is compared with a corresponding sample of the data originally received. During this comparison process, when a value associated with an actual sample is less than the filtered sample, thus meaning that the actual sample is beneath the detection threshold, the processor of the depth sounder of the present invention rejects the sample, and does not display data corresponding to the rejected sample. When, however, the actual sample has a data value that is greater than the data value of the filtered sample, processing advances to the next sample for performing the necessary comparison.

In accordance with a further aspect of the invention, any data above the detection threshold, but that is shorter in duration than a lower time limit, is rejected. Accordingly, data will only be displayed on the display of the sonar depth sounder when each of a series of consecutive samples is greater than the corresponding filtered samples, and wherein the time frame associated with the series of consecutive samples is greater than the lower time limit. Thus, data indicative of a spike, which clearly surpasses the detection threshold, but which is shorter in duration, will be eliminated. Additionally, the time limit utilized in making the determination of whether data should or should not be displayed on the display is based upon the preliminary established rejection value. In other words, in the case where the preliminary established value is based upon ambient noise conditions, when the ambient noise conditions in the underwater environment are relatively low, the corresponding time limit that data believed to be indicative of underwater noise must remain above the detection threshold is correspondingly low. However, when the ambient noise has been determined to be relatively high, the time limit utilized for rejecting data is longer, such that a greater number of consecutive data samples must remain above the detection threshold in order for the data to be displayed.

BRIEF DESCRIPTION OF THE DRAWINGS

The objects and features of the invention noted above are explained in more detail with reference to the drawings, in which like reference numerals denote like elements, and in which:

FIGS. 10a and 10b illustrate noise detected by a sonar depth sounder of the present invention, wherein FIG. 10b illustrates application of a time varying detection threshold to that sensed noise.

DETAILED DESCRIPTION OF THE INVENTION

Figure 1:
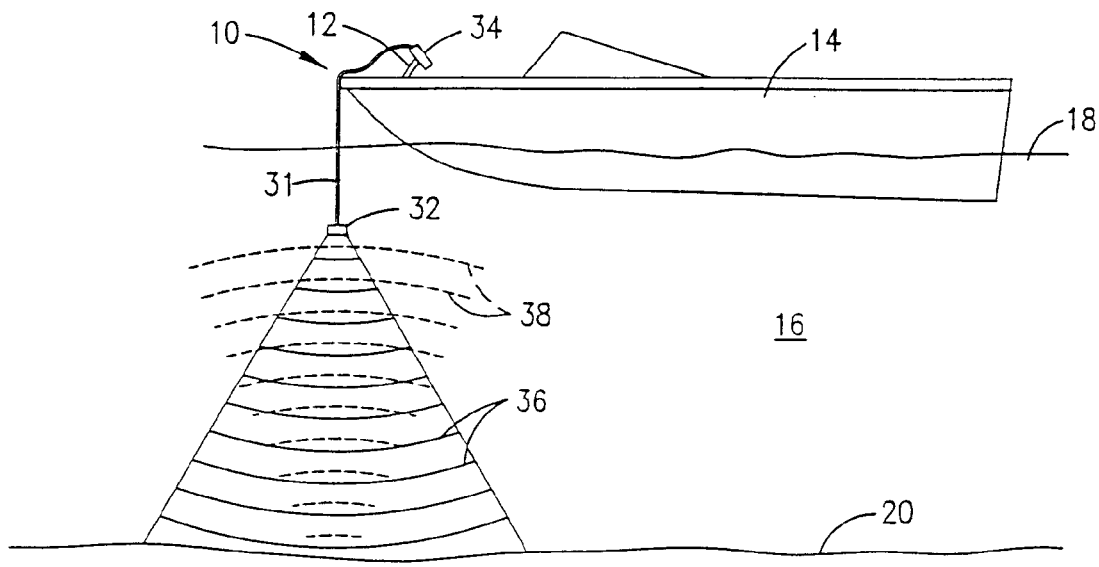
FIG. 1 is a side elevational view of a boat having a depth sounder of the present invention installed thereon.

With reference to the figures, and particularly FIG. 1, a sonar depth sounder of the present invention is designated generally by reference numeral 10. As illustrated, sonar depth sounder 10 is positioned by a mount 12 on the deck of a boat 14, which is floating in a body of water 16. The body of water 16 has a top surface 18, and a bottom surface 20.

Figure 2:
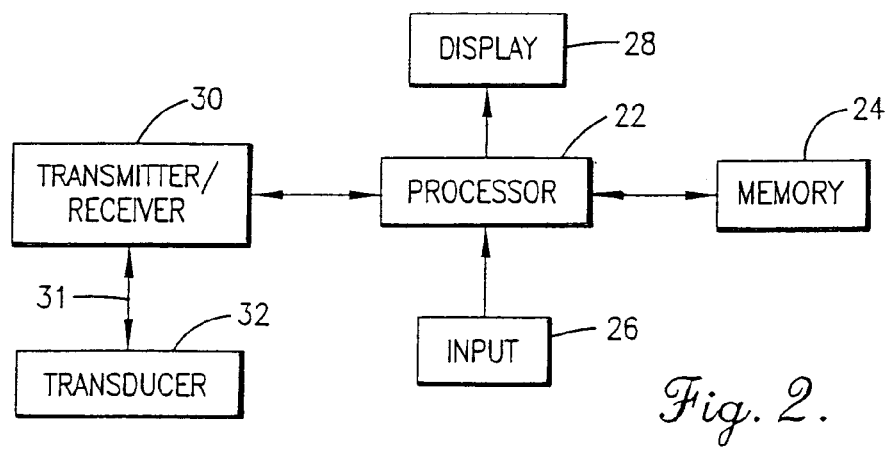
FIG. 2 is a block diagram of the components of the depth sounder of the present invention.

With additional reference to FIG. 2, sonar depth sounder 10 has a processor 22 and a memory 24, connected as shown. An input 26, such as a keypad, is connected to processor 22. Additionally, a display 28, for displaying a visual representation of bottom surface 20 of the body of water, and objects floating in the body of water, is also connected to processor 22. A transmitter/receiver combination, designated by reference numeral 30, is also connected to processor 22. A transducer 32 is connected to transmitter/receiver combination 30, as illustrated.

As illustrated in FIG. 1, the sonar depth sounder 10 of the present invention has a housing 34, connected to the mount 12. As will be understood, processor 22, memory 24, input 26, display 28, and transmitter/receiver 30 are housed within housing 34. Particularly, input 26, and display 28 are accessible at a face of housing 34 in a conventional fashion. Transducer 32 is suspended, from line 31, into the body of water 16.

Figure 3:
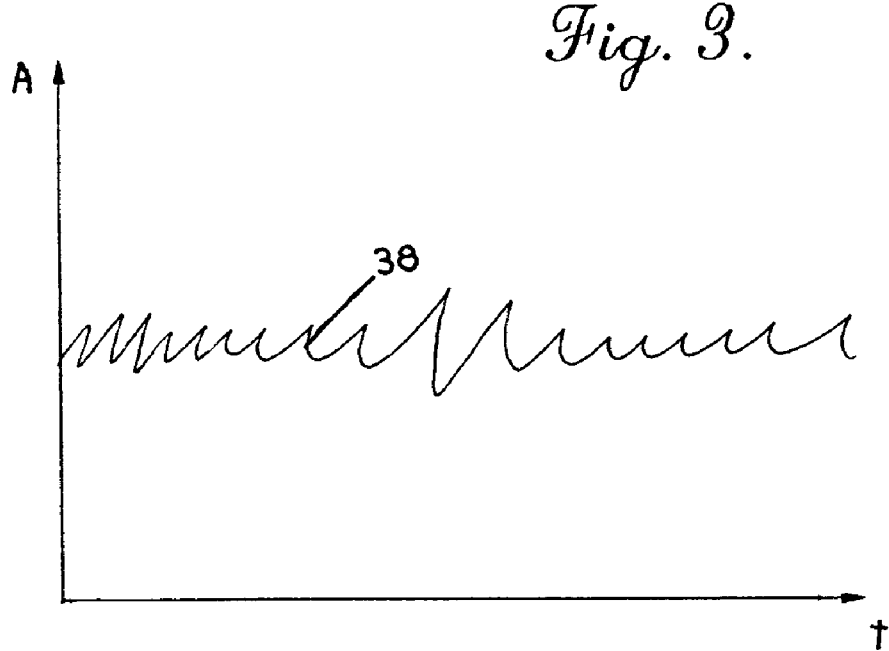
FIG. 3 is a graphical representation of a sonar signal representative of ambient noise.

During operation of sonar depth sounder 10, processor 22 first controls the receiver portion of transmitter/receiver combination 30 to receive sonar signals indicative of ambient noise in the underwater environment. Particularly, processor 22 receives an electrical signal indicative of the ambient, environmental noise in the underwater environment. With reference to FIG. 3, a sonar signal 38 indicative of the ambient noise in the underwater environment is illustrated. Processor 22 receives sonar signal 38, and processes the signal 38 to calculate a detection threshold value. Particularly, the processor calculates the detection threshold value (DT) according to the following equation:

$$DT = mean_{ambient} + \alpha \, variance_{ambient}.$$

Where $mean_{ambient}$ is the mean of the signal 38 indicative of the ambient noise in the underwater environment, $variance_{ambient}$ is the variance of the signal 38 indicative of the ambient noise in the underwater environment, and $\alpha$ is a scaling factor. The scaling factor $\alpha$ has been determined by testing, and is preferably between 2 and 15, and more particularly, is preferably about 7. It will be understood and appreciated that other scaling factors could be used.

The detection threshold (DT) value calculated by processor 22 is stored in memory 24 of depth sounder device 10.

During additional operation of sonar depth sounder 10, processor 22 controls the transmitter portion of transmitter/receiver combination 30 to emit a plurality of output pulses. Those pulses cause transducer 32 to emit a series of sonar signals into the body of water 16. Particularly, transducer 32, when activated by the transmitter, sends out an ultrasonic pressure wave in an expanding pattern into the body of water 16. As will be readily appreciated by those skilled in the art, that expanding pattern defines what is often referred to, in simplified terms, as a cone of detection. FIG. 1 illustrates the expanding ultrasonic waves emitted from transducer 32 by reference numeral 36. The ultrasonic waves 36 bounce, or echo, off of the bottom surface 20, sending back expansion echo waves, designated generally by reference numeral 38. As will be readily understood, echos also reflect off of objects suspended within the body of water 16, including particularly fish. The receiver portion of transmitter/receiver combination 30 receives the echo waves, and sends the signals (e.g., data) representative of the received echo waves to processor 22 for processing.

Figure 4:
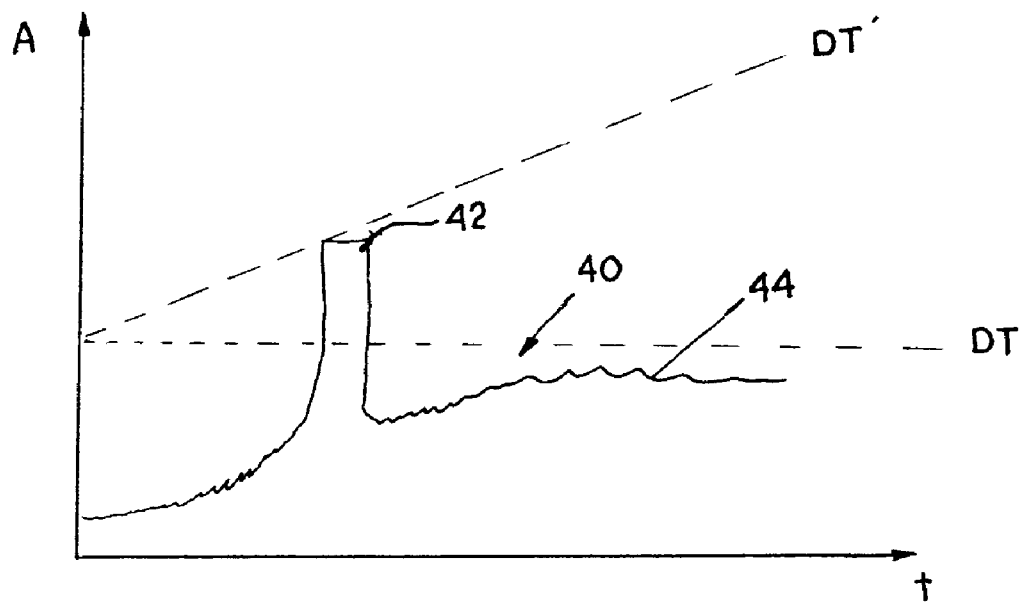
FIG. 4 is a graphical representation of a signal indicative of a sonar echo signal received by the receiver of the sonar device.

With additional reference to FIG. 4, a graphical representation in the form of a timing diagram is presented which illustrates, in signal form, a received echo signal, as designated by reference numeral 40. As illustrated, echo signal 40 includes echo portion 42 and additive noise, as indicated by reference numeral 44.

In accordance with an important aspect of the invention, processor 22 processes the received echo signal and eliminates any portion of the signal having an amplitude lower than the detection threshold value. In accordance with known display control techniques, processor 22 then causes display 28 to display a visual representation of that data in echo signal 40 which is greater in amplitude than the detection threshold value. Particularly, that data which is greater in amplitude than the selected detection threshold value is processed according to an object identification algorithm, as illustrated and described in U.S. patent application Ser. No. 09/075,416 entitled "Depth Sounder With Object Identification Feature", incorporated herein by reference in its entirety.

In accordance with an additional important aspect of the present invention, the detection threshold value is periodically updated. In this regard, at a selected interval, processor 22 causes the receiver of transmitter/receiver combination 30 to receive sonar signals generated from ambient noise conditions in the underwater environment. Those sonar signals are utilized by processor 22 to calculate an updated detection threshold value, which is stored in memory. Preferably, the detection threshold value is updated approximately every second. Thus, as the ambient noise levels in an underwater environment change, the detection threshold value is changed to permit the processor 22 to process active data received in response to a noise interrogation from the transmitter, and then display only data indicative of underwater objects or features which are represented by sonar signals having an amplitude greater than the updated detection threshold value. Stated differently, an increase in ambient noise in the underwater environment causes the processor to eliminate additional data, so as to prevent the display 26 from being cluttered with visual representations of noise. Alternatively, when the ambient noise levels in the underwater environment decrease, the detection threshold value is lowered, thereby permitting weaker, and potentially a greater number of signals, to be received and processed by the processor 22, thus permitting additional object identification data to be displayed on display 26.

In accordance with yet an additional aspect of the invention, the detection threshold value is preferably increased over time from its starting point, as illustrated graphically, by reference DT' in FIG. 4. This increase in the detection threshold value compensates for the increase in gain which is occurring over time in conventional fashion in depth sounder device 10. Preferably, the detection threshold value increases linearly over time at a slope determined through testing.

With reference now to FIGS. 5–10, an alternate embodiment of the present invention is illustrated and described.

Figure 5:
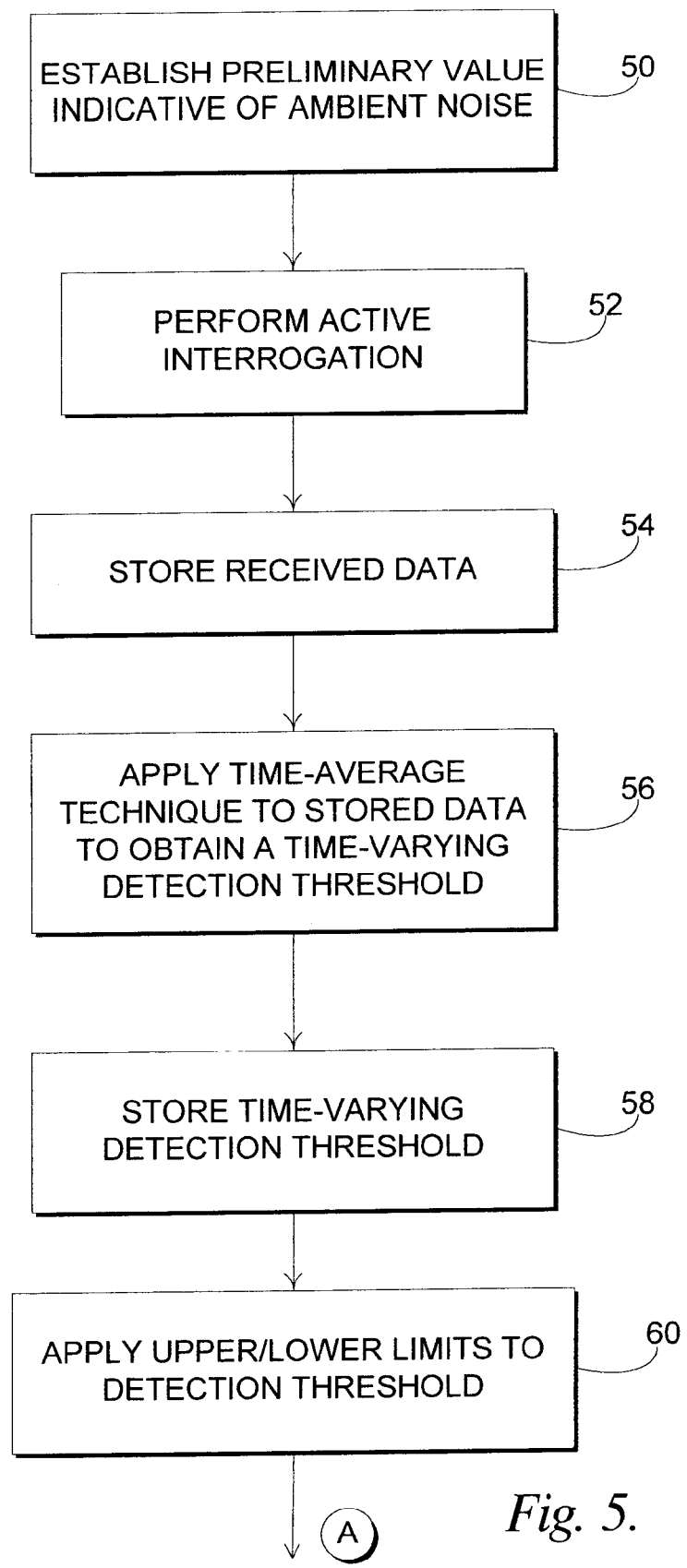
FIG. 5 is a flow chart of the process/method of an alternate embodiment of the present invention.
Figure 5:
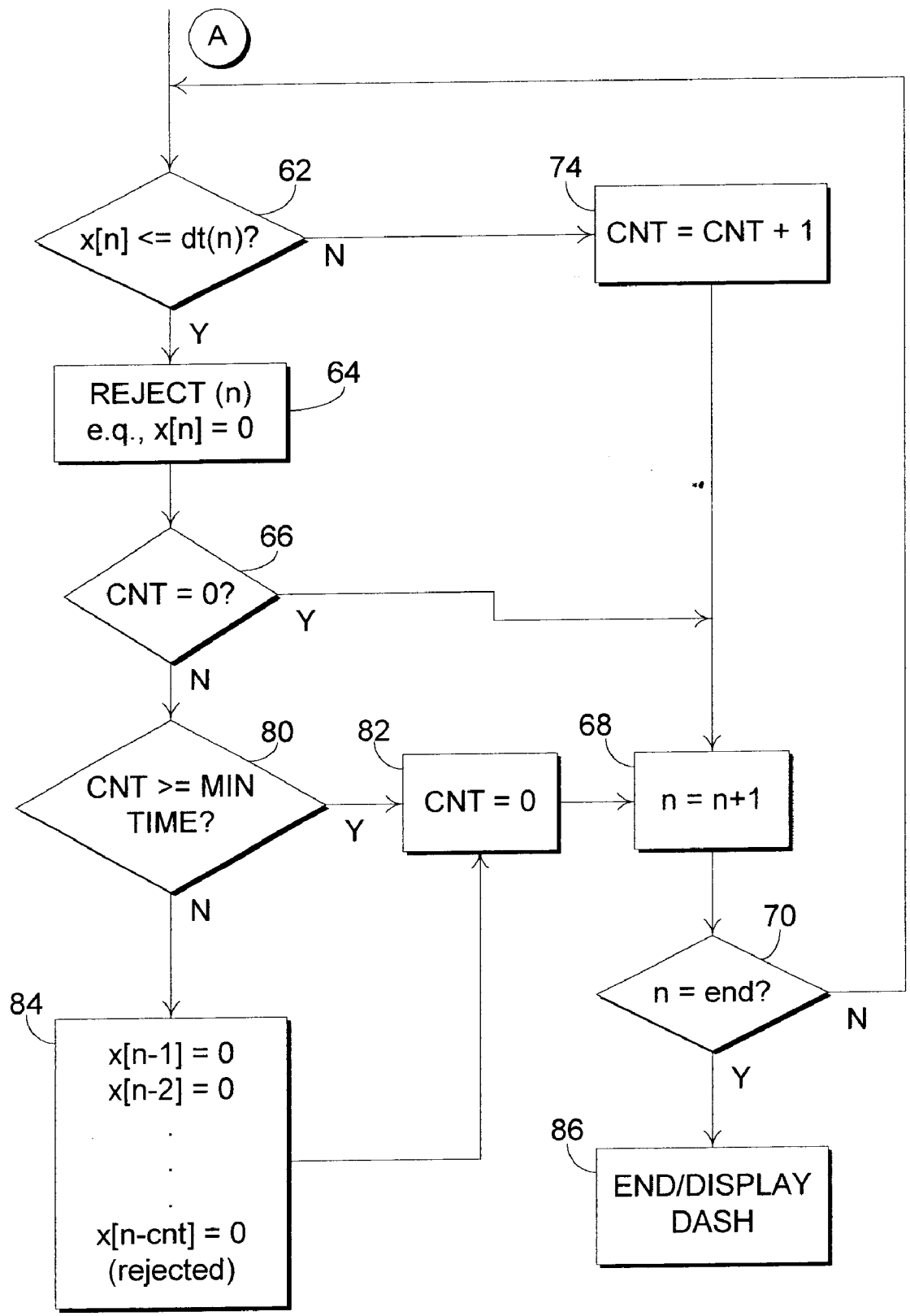

With reference initially to FIG. 5, a process carried out by processor 22 in conjunction with application software stored in memory 24 is illustrated and described. In particular, a preliminary value indicative of ambient noise in the underwater environment is established, as illustrated at step 50. This preliminary value may be established, as described above, by taking a passive interrogation such that ambient noise in the underwater environment 16 is detected by the transceiver 30, and processed by processor 22 into a corresponding data value indicative of the ambient noise in the underwater environment. Alternatively, the preliminary established value may be a value corresponding to the predicted level of noise in the underwater environment 16, and may therefore be entered by a user utilizing input 26 of the sonar depth sounder device 10. In particular, for example, the user may select whether he or she wants low, moderate, or high levels of ambient noise rejection, and make a corresponding selection with input 26. In this regard, corresponding values will be stored in memory 24 in conjunction with each of the input levels, such that (for instance), upon entry of a "low" rejection level, a first "low" data value will be utilized as the preliminary established data value.

At step 52, sonar depth sounder device 10 performs an interrogation cycle by transmitting the sonar signal into the body of water 16. As will be understood, and as described above, the transceiver 30 will receive reflected echo signals reflected, echo sonar signal 38. In accordance with the invention, sonar depth sounder 10 sampled a received sonar echo signal, digitizes the sample data, and stores the digitized data in memory 24, as indicated at step 54. Then, a continuous-time averaging technique is applied to the stored data samples to obtain a time varying detection threshold, as indicated at step 56. More particularly, a time averaging technique is applied to a portion of the data samples, such that some window representative of a time less than the overall window of sample data receives application of a continuous-time averaging technique. Preferably, the continuous-time averaging technique is accomplished by applying the selected data to a low pass filter. However, as will be appreciated, other continuous-time averaging techniques, such as utilization of a correlative window, may be utilized. For purposes of this document, reference will be made to filtered data, since a low pass filtering technique is the preferred application of a continuous time-averaging technique. It should be understood and appreciated, however, that reference to filtering data should include any data to which a continuous time-averaging process has been applied.

With reference to step 58, the filtered data samples and, namely, the detection threshold represented by the filtered data samples, are stored in memory 24. As indicated at step 60, lower and upper limits are applied to the filtered data samples. In this regard, a numeric measure corresponding to the preliminary established value (at step 50) is utilized in establishing a lower and upper limit for the detection threshold. Application of a lower and upper limit to the detection threshold prevents the filtered data from generating detection thresholds that are too high or too low to be practical given the current or predicted noise conditions. The method and process of the present invention then continues with a comparison, on a sample-by-sample basis, of the originally stored data samples (e.g., those data samples that are indicative of the raw data received by the transceiver 30 and stored at step 54) and the filtered data samples.

In particular, as indicated ate step 62, a comparison of data sample x[n], which is a sample in the digital raw signal array initially received and stored, and its associated digital filtered (and possibly limited) detection threshold sample, indicated by dt[n]. At the outset of the comparison process, n is initialized to zero. Additionally, a counter represented by CNT, for monitoring time, is initialized to zero. Thus, at step 62, the first sample is zero. A first sample, x[n], where n=0, is compared with the first digitally filtered sample dt[n], where n=0. When, at step 62, processor 22 determines that x[n] is less than or equal to dt[n], processing advances to step 64 where x[n] is rejected, and data indicative thereof will not be displayed on display 28 of sonar depth sounder 10 when processing is completed at "End" step 86. Processing then advances to step 66, where processor 24 determines whether the counter equals zero. In the event the counter does equal zero, such as will be the case upon the start of the comparison process, processing advances to step 68, wherein n is updated by 1 (e.g., the next sample comparison to be made). Processing then advances to step 70, wherein a determination is made whether the processing has reached the end of the data. As illustrated, if at step 70 it is determined that the end of the data has been reached, processing advances to step 72, wherein any data to be displayed is displayed. However, when there is additional data to be processed, processing returns to step 62 and the next sample comparison is made.

At step 62, when it is determined that a sample comparison results in the then x[n] not being less than or equal to td[n], processing advances to step 74, and the counter is updated by 1. In other words, when it is determined that a particular actual data sample is greater than a filtered data sample, the counter is updated at 74, the next corresponding set of samples are retrieved at step 68, and processing routes through step 70 back to step 62. This process will continue until a particular raw data sample x[n] being compared is less than or equal to the corresponding detection threshold sample dt[n], as determined at step 62. In that instance, the then actual sample x[n] being compared will be rejected at step 64. In such a case, it will be determined at step 66 that the counter is not zero, since it had been updated one or more times at step 74, and processing will advance to step 80, wherein the processor 24 determines whether the counter is greater than a minimum time duration. In this regard, as described, only information associated with data that is greater than the detection threshold for a selected period of time is actually displayed on the display 28. Accordingly, when it is determined that successive data samples x[n], x[n+1], . . . have achieved the minimum time duration, meaning that the counter is greater than (or equal to) the selected minimum time duration as determined at step 80, processing advances to step 82, wherein the counter is reset to zero. Processing then advances to step 68, wherein n is updated by 1, and processing continues. In particular, when it is determined at step 80 that the counter is above the minimum time duration, information associated with any and all data samples corresponding to that count are displayed on the display, at the end of the comparison process at step 86. When, however, it is determined at step 80 that the counter is not greater than the minimum time duration, processing advances to step 84, wherein each of the preceding actual data samples associated with the count are rejected, and information indicative thereof will not be displayed. Processing then advances to step 82, wherein the counter is reset, and processing continues. Additionally, the minimum time duration utilized at step 80 is a data value retrieved from memory 24. Preferably, the minimum time duration utilized corresponds with the preliminary established value at step 50.

Figure 6:
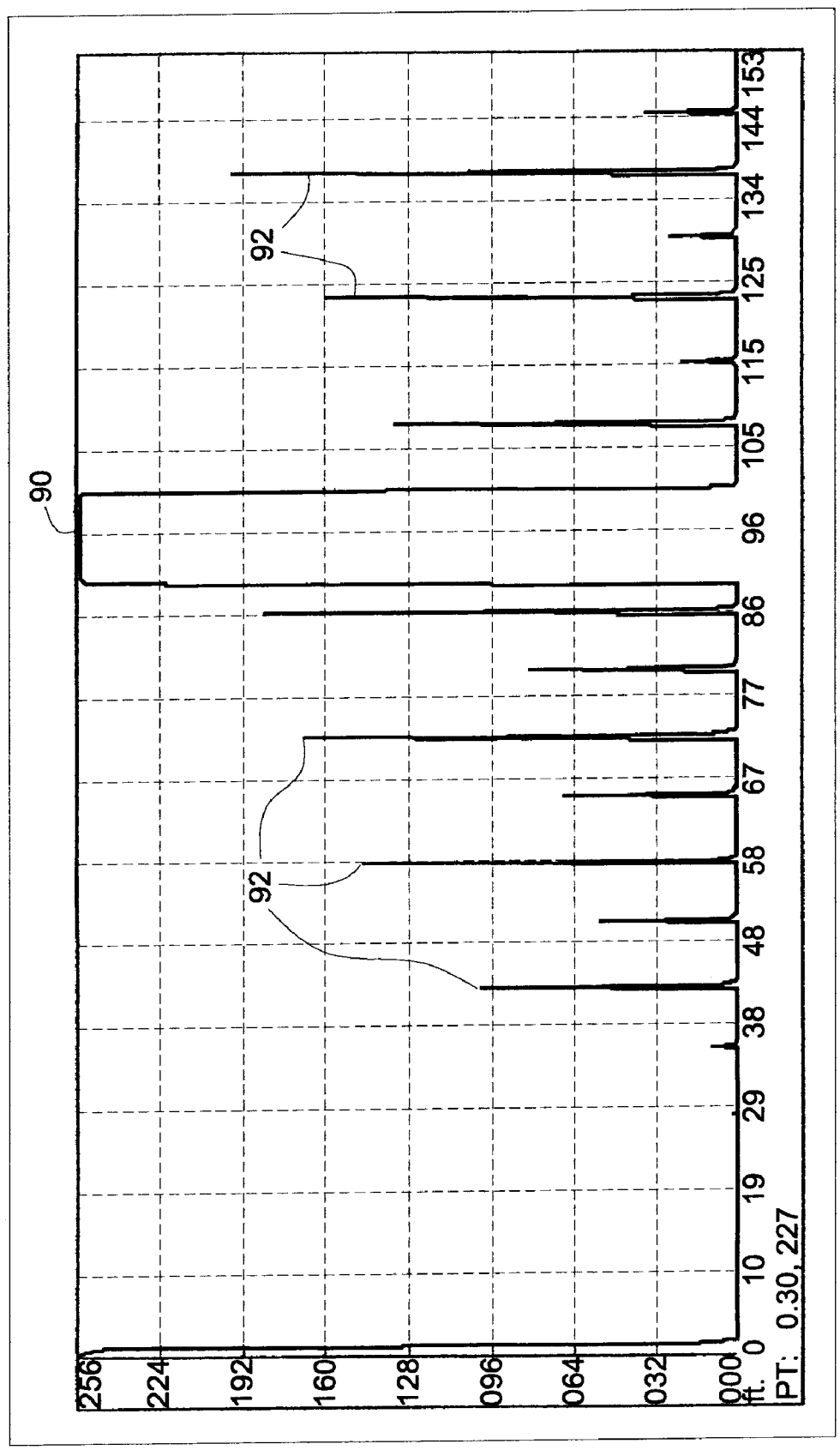
FIG. 6 is a graph over time indicative of the sonar interrogation cycle.
Figure 9:
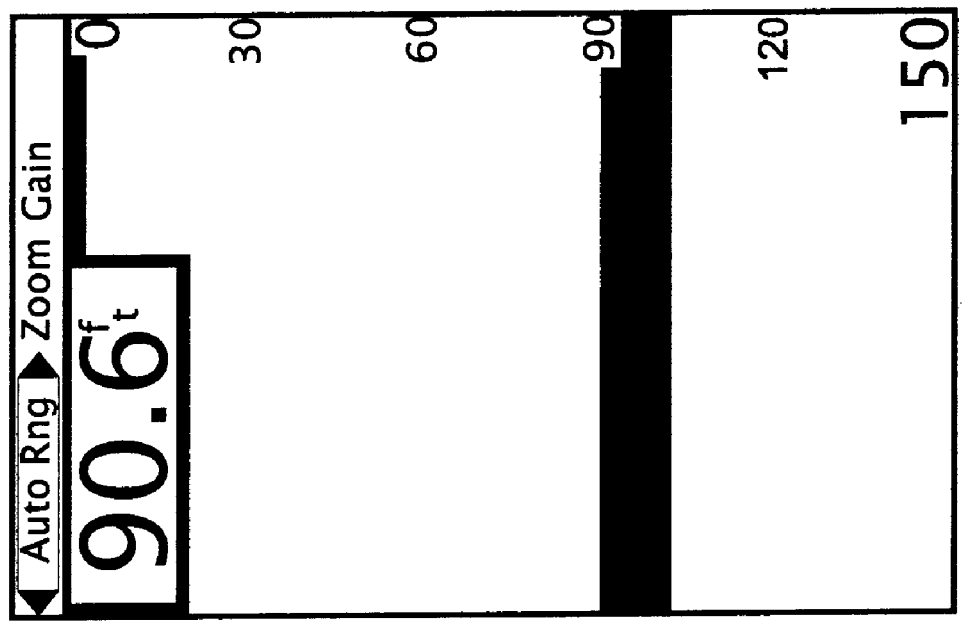
FIG. 9 is a sonar depth sounder display screen of the present invention displaying information indicative of the graphical data of FIG. 7 having had the detection threshold applied.
Figure 7:
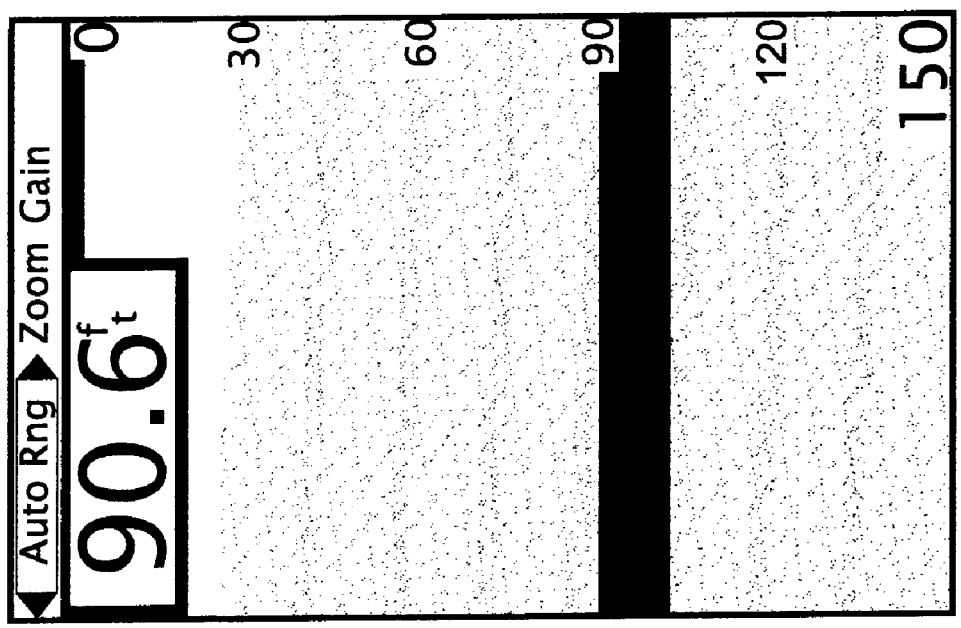
FIG. 7 is a display screen indicative of the data retrieved in the interrogation cycle of FIG. 5.

With reference now to FIG. 6, a graphical representation of a sonar interrogation made by sonar device 10 is illustrated. As seen, a sonar echo signal indicative of a bottom of the underwater environment, and denoted by reference numeral 90, is clearly visible to the eye at approximately 90 feet. However, as illustrated, other noise data, represented by spikes 92 on the graph, and indicative of ambient noise in the environment, is present. With reference to FIG. 7, display 28 of sonar depth sounder is shown, illustrating the bottom of the underwater environment at 90 feet, but also illustrating a cluttered image corresponding to the ambient noise in the underwater environment, represented by the spikes in the graph of FIG. 6.

Figure 8:
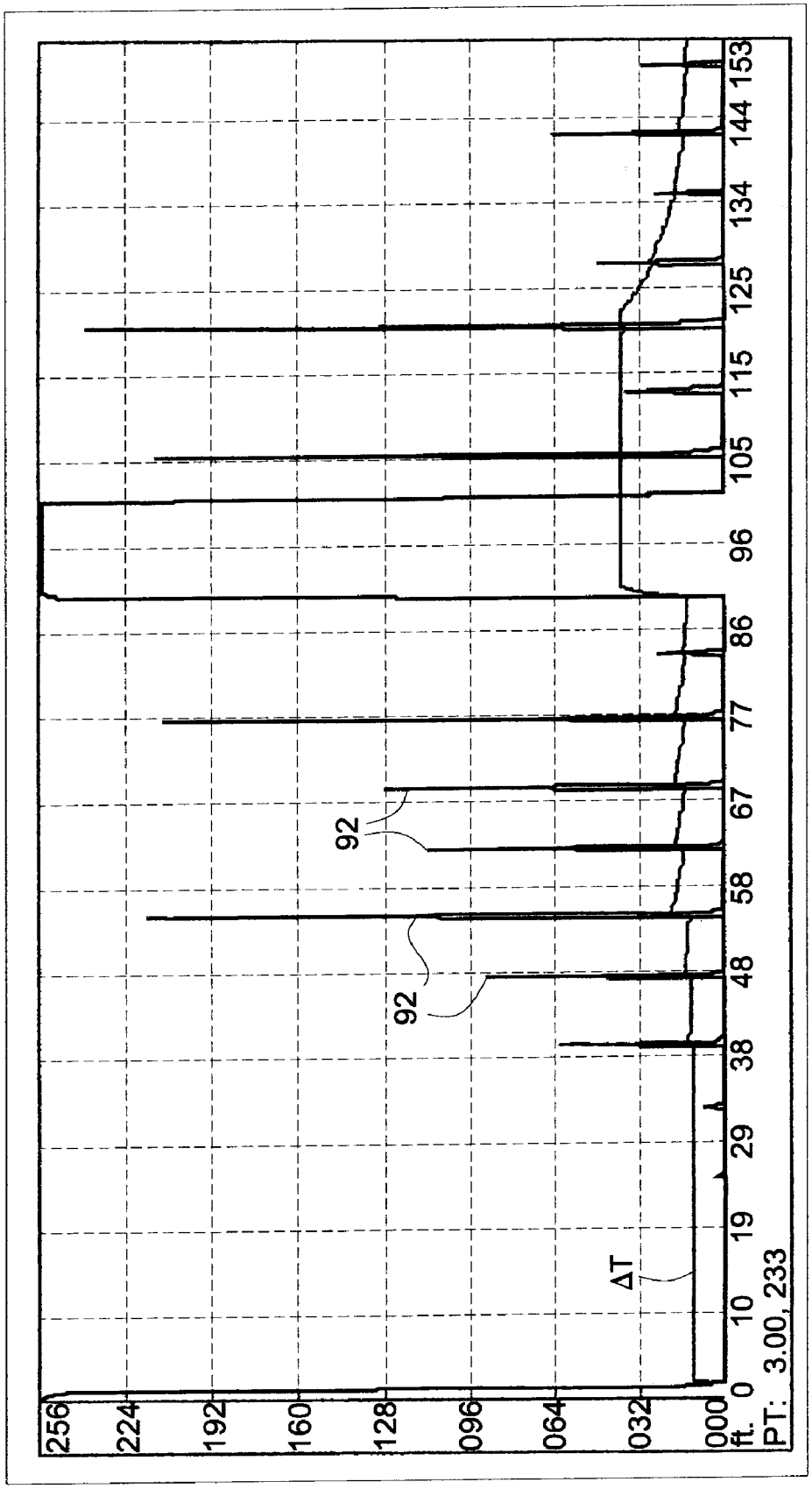
FIG. 8 is the same graph of data illustrated in FIG. 5, albeit illustrated with application of a time varying detection threshold.

With reference now to FIG. 8, an example of application of the present invention to the same graph is illustrated and described. In particular, the detection threshold, indicated by DT is determined in accordance with the process previously described. As illustrated, those areas in which the detection threshold is flat, such as from approximately zero to 38 feet, and from approximately 92 feet to 120 feet, are illustrative of the limits imposed by upper and lower thresholds, as previously described. As illustrated, those spikes 92 indicative of ambient noise which extend above the detection threshold DT are generally short in duration and, as a result, will most likely be rejected by the process previously described. Accordingly, with reference to FIG. 9, a display screen illustrating the sensed data, but utilizing the data rejection feature of the present invention, as illustrated. As seen, the display screen is much cleaner than that represented in FIG. 7.

Figure 10A:
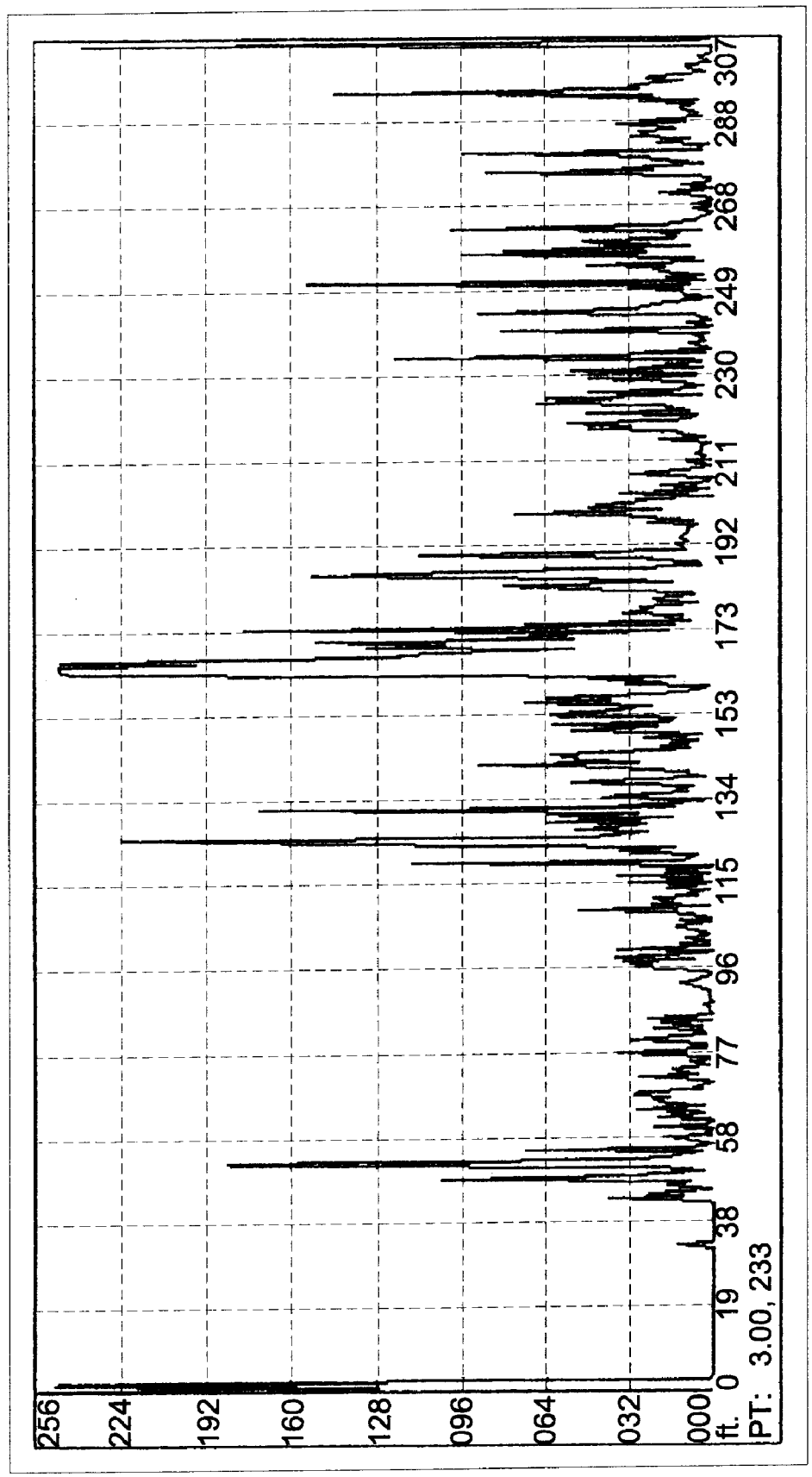
Figure 10B:
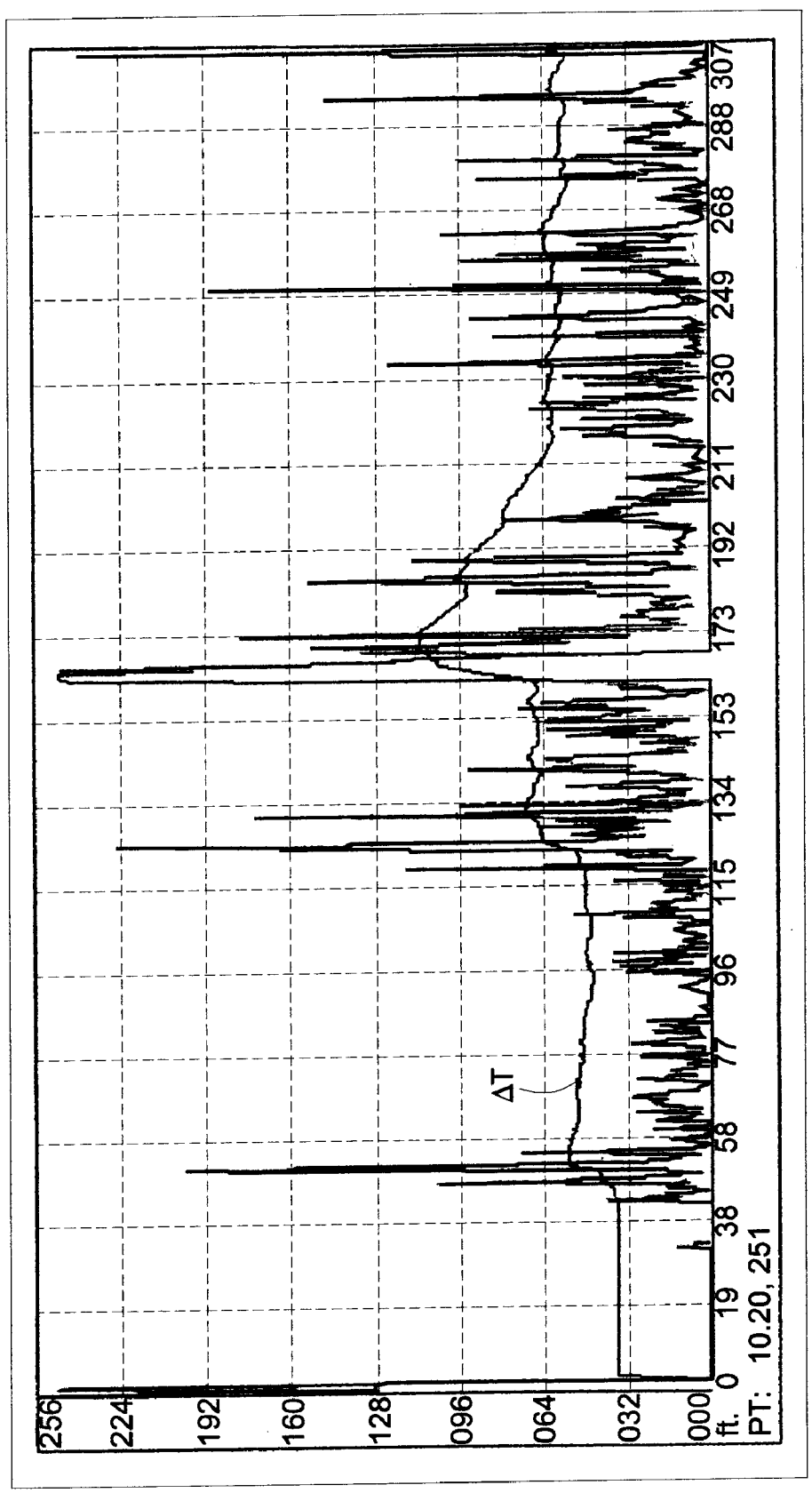

With reference to FIG. 10a, the graph illustrates a sonar echo signal indicative of a bottom of the underwater environment near 160 feet, albeit nestled in a bed of undesirable passive noise. FIG. 10b shows the time bearing detection threshold DT created by the described method. Note that a minimum level of around 40 is illustrated, but the maximum level that the DT was allowed to reach was not achieved. Accordingly, these graphs demonstrate the ability of the inventive technique to meet the best goals of rejecting noise, while preserving the signal based both on passive noise sensing and on the signal content of each individual sonar interrogation.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A sonar depth sounder device comprising:
    a display;
    a transmitter for generating a sonar signal toward the bottom surface of a body of water;
    a receiver;
    a processor connected to said transmitter and said receiver, wherein said transmitter transmits a sonar signal into said body of water, and wherein said receiver receives a corresponding echo sonar signal, wherein said echo sonar signal is sampled, and wherein a continuous time average is applied to at least a portion of the data corresponding to said samples, thereby creating a time varying detection threshold;
    wherein said sonar depth sounder device further comprises a memory, and wherein data indicative of data samples received by said receiver or stored in said memory, and wherein data indicative of said data samples after said continuous time average technique has been applied to said originally received data is stored in memory;
    wherein each data sample of said averaged data samples is compared with a corresponding data sample of said originally received set of data, and wherein, when a numeric value of an originally received data sample is greater than a data value associated with its corresponding averaged data sample, information indicative of said original data sample is displayed on said display;
    wherein when a numeric value associated with a data sample of said originally received data is less than a corresponding data value of said averaged data, said originally received data sample is rejected, and information indicative thereof is not displayed on said display; and wherein said processor, prior to making said comparison, applies lower and upper limits to said detection threshold.

2. The sonar depth sounder device as set forth in claim 1, wherein said lower and upper limits are based upon a preliminary established value indicative of ambient noise in said body of water.

3. The sonar depth sounder device as set forth in claim 1, wherein said preliminary determined value is based upon a user input indicative of a predicted ambient noise level in said body of water.

4. The sonar depth sounder device as set forth in claim 1, wherein each data sample of said averaged data samples is prepared with a corresponding data sample of said originally received set of data, and wherein, when each of a set of data samples corresponding to the originally received data is greater than its corresponding average data sample, and wherein, each of the said set of consecutive data samples corresponding to said originally received data has associated time which is greater than a minimum time limit, information indicative of said set of consecutive original data samples is displayed on said display.

5. The sonar depth sounder device as set forth in claim 1, wherein said continuous-time average application is accomplished with.

6. The sonar depth sounder device as set forth in claim 1, wherein said continuous-time average application is accomplished with a correlative window.

7. A method for eliminating ambient noise received by a sonar depth sounder having a display, said method comprising:
    transmitting at least one sonar signal to an underwater environment;
    receiving an echo sonar signal corresponding to said transmitted signal;
    sampling said received echo sonar signal, resulting in a sequence of data samples;
    applying a continuous time average to said sequence of data samples, thereby obtaining a detection threshold; and
    applying upper and lower limits to said detection threshold.

8. The method as set forth in claim 7, further comprising:
    comparing said data to which said continuous time average has been applied with said originally received sample data; and
    making a determination of whether to display information indicative of said sample data based upon said comparison.

9. The method as set forth in claim 8, wherein the step of making said determination further comprises:
    comparing each data sample with a corresponding data sample of said detection threshold and, when a data sample is greater than the corresponding sample in the detection threshold, then displaying information on the display indicative of said data sample.

10. The method as set forth in claim 9, wherein the step of making said determination further comprises:
    comparing each data sample with a corresponding data sample of said detection threshold and, when a data sample is less than electing not to display information indicative of said data sample on said display.

11. The method as set forth in claim 8, wherein the step of making said determination further comprises:
    comparing each data sample with a corresponding data sample of said detection threshold and, when a consecutive set of said data sample is greater than their corresponding said samples in said detection threshold, and wherein said consecutive set of said data samples is associated with a time that is greater than a time limit, then displaying information indicative of said consecutive set of data samples on said display.

12. The method as set forth in claim 7, wherein said method is carried out by a series of processor implemented instructions in a processor-readable medium.

13. A sonar depth sounder device comprising:

a display;

a transmitter for generating sonar signal toward the bottom surface of a body of water;

a receiver;

a processor r connected to said transmitter and said receiver, wherein said transmitter transmits a sonar signal into said body of water, and wherein said receiver receives a corresponding echo sonar signal, wherein said echo sonar signal is sampled, and wherein a continuous time average is applied to at least a portion of the data corresponding to said samples, thereby creating a time varying detection threshold, wherein said processor, prior to making said comparison, applies lower and upper limits to said detection threshold.

14. The sonar depth sounder device as set forth in claim 13, wherein said continuous-time average application is accomplished with a low pass filter implemented in a medium readable by said processor.

15. The sonar depth sounder device as set forth in claim 14, wherein said continuous-time average application is accomplished with a correlative window.

16. A sonar depth sounder device comprising:

a display;

a transmitter for generating sonar signal toward the bottom surface of a body of water;

a receiver;

a processor connected to said transmitter and said receiver, wherein said transmitter transmits a sonar signal into said body of water, and wherein said receiver receives a corresponding echo sonar signal, wherein said echo sonar signal is sampled, and wherein a continuous time average is applied to at least a portion of the data corresponding to said samples, thereby creating a time varying detection threshold, wherein said continuous-time average application is accomplished with a series of software instructions for accomplishing a low pass filter filtering operation.

17. The sonar depth sounder device as set forth in claim 16, wherein said low pass filtering operation is accomplished with a correlative window.

* * * * *